(12) United States Patent
Inoue et al.

(10) Patent No.: US 6,168,882 B1
(45) Date of Patent: Jan. 2, 2001

(54) SEAWATER ELECTRIC POWER SYSTEM

(75) Inventors: Yoshiki Inoue; Masako Inagawa, both of Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/135,057

(22) Filed: Aug. 18, 1998

(30) Foreign Application Priority Data

Aug. 18, 1997 (JP) .................................... 9-221505

(51) Int. Cl.$^7$ .................................... H01M 6/34
(52) U.S. Cl. .................. 429/119; 429/118; 429/9; 429/6; 320/1
(58) Field of Search .................. 429/9, 72, 119, 429/127, 118, 6; 320/1, 13, 14

(56) References Cited

U.S. PATENT DOCUMENTS

| | | | |
|---|---|---|---|
| 3,884,216 | * 5/1975 | McCartney | 126/204 |
| 3,908,548 | * 9/1975 | Wedding | 102/13 |
| 4,184,009 | * 1/1980 | Armstrong | 429/27 |
| 4,763,126 | * 8/1988 | Jawetz | 340/985 |
| 5,006,872 | * 4/1991 | Hammond et al. | 363/24 |
| 5,009,757 | * 4/1991 | Riffe et al. | 204/147 |
| 5,663,628 | * 9/1997 | Fujii | 320/1 |

* cited by examiner

Primary Examiner—Stephen Kalafut
Assistant Examiner—Raymond Alejandro
(74) Attorney, Agent, or Firm—McGinn & Gibb, PLLC

(57) ABSTRACT

A seawater electric power system has a solar cell or wind generator for generating electromotive force, a battery including a plurality of electric double layer capacitors each having seawater therein as an electrolytic solution for storing the electric energy, a voltage regulator, and a seawater replenishment section for replenishing seawater into the electric double layer capacitors. A long term operation can be obtained by the seawater electric power system substantially without regular maintenance.

8 Claims, 4 Drawing Sheets

SEAWATER ELECTRIC POWER SYSTEM

BACKGROUND OF THE INVENTION (a) Field of the Invention

The present invention relates to a seawater electric power system for supplying electric power for a long term in a marine ambient wherein regular maintenance is difficult to achieve for the seawater electric power system.

(b) Description of the Related Art

A seawater electric power system implemented by a seawater battery system is described in JP-A-8(1196)-17446, for example. FIGS. 1 and 2 show a block diagram and a schematic perspective view, respectively, of the seawater battery system described therein.

The seawater battery system includes a seawater battery 40 for generating an electromotive force by reducing the oxygen dissolved in the seawater, a booster 41 for boosting the electromotive force of the seawater battery 40, a secondary battery 43, charged by the boosted electromotive force from the booster 41, for supplying the output DC power thereof to a load 42, and a control circuit 44 driven by the output of the secondary battery 42 for controlling the booster 41.

The seawater battery 40 has an anode plate 40*a* made of a first metal having a smaller ionization tendency or an alloy containing the first metal as a main component thereof, a pair of cathode plates 40*b* made of a second metal having a larger ionization tendency or an alloy containing the second metal as a main component thereof. It is described in the publication that the seawater battery system is capable of supplying a stable DC power to the load 42 for a long term by the configuration employed.

However, the seawater battery system is liable to an external mechanical force because of absence of a housing or protective member, which generally necessitates regular maintenance for every half a year due to the damages of the anode plate 40*a* and the cathode plate 40*b*. In addition, it is difficult to reduce the size and increase the output power of the seawater battery system due to its configuration of the anode plate 40*a* and the cathode plate 40*b*.

On the other hand, electric double layer capacitors are widely used recently as auxiliary batteries for personal computers and memories. A conventional electric double layer capacitor is described in JP-A-4-288361, JP-A-4-206916 and JP-A-64(1989)-53406, for example.

A typical electric double layer capacitor includes a plurality of basic cells, one of which is shown in FIG. 3. The basic cell has a porous separator 30 having a function for permitting ion permeation therethrough without electron permeation, a pair of polarized electrodes 31 for sandwiching therebetween the porous separator 30 and each made of activated carbon soaked with electrolytic solution, a pair of collectors 32 each disposed in contact with the outer surface of a corresponding one of the polarized electrodes 31, and a gasket 33 disposed between the peripheries of the pair of collectors 32 for sealing therebetween the polarized electrodes 31 and the separator 30. Sulfuric acid is generally used in the electric double layer capacitor as its electrolytic solution.

The conventional electric double layer capacitor generally suffers from degradation of charge/discharge characteristics due to the stop of ion conduction, which results from evaporation of water from the sulfuric acid, after the electric double layer capacitor is subjected to a high temperature ambient, such as direct sunshine, for a long time. The problem degradation may be prevented by improving the sealing of the gasket, which raises the costs of the electric double layer capacitor, however.

SUMMARY OF THE INVENTION

It is therefore an object of the present invention to provide an improved seawater electric power system capable of reducing the number of times for maintenance per unit term by keeping excellent charge/discharge characteristics after the seawater electric power system is subjected to a high temperature ambient for a long term.

The present invention provides a seawater electric power system comprising an energy converter for converting energy other than electric energy to electric energy, a battery for storing the electric energy obtained by the energy converter, the battery having seawater as an electrolytic solution for storing the electric energy, and a seawater replenishment section for replenishing seawater to the battery.

In accordance with the seawater electric power system of the present invention, the charge/discharge characteristics of the seawater electric power system are not degraded because seawater is replenished to the battery by the seawater replenishment section. In addition, the interior of the battery need not be sealed, which does not raise the costs for the seawater electric power system.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
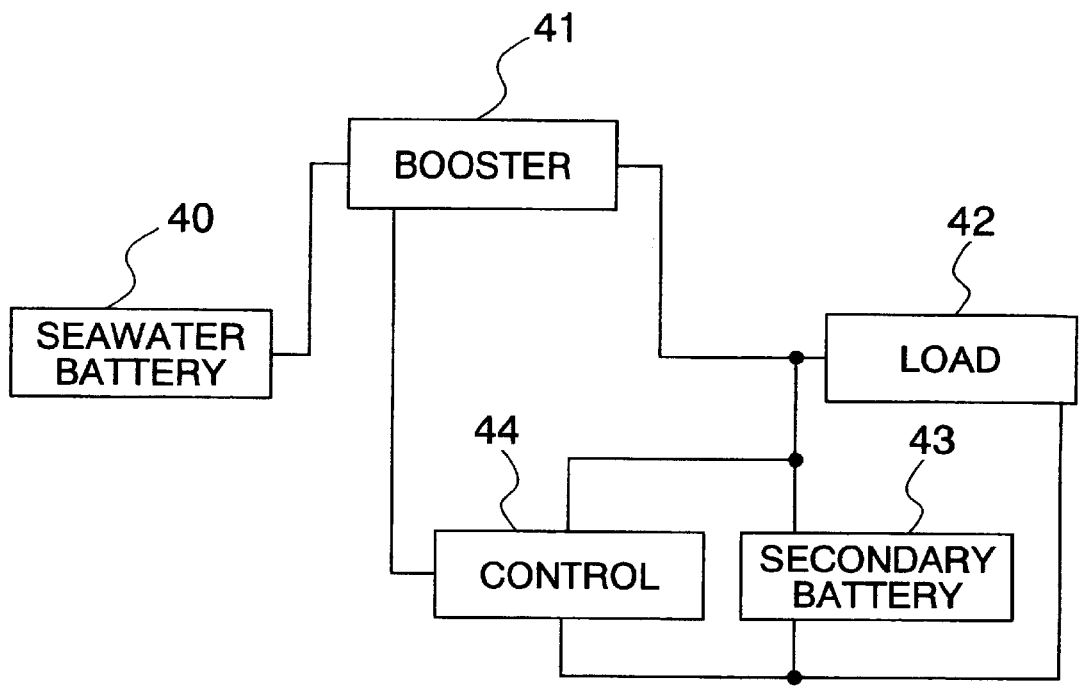
FIG. 1 is a block diagram of a conventional seawater electric power system.
Figure 2:
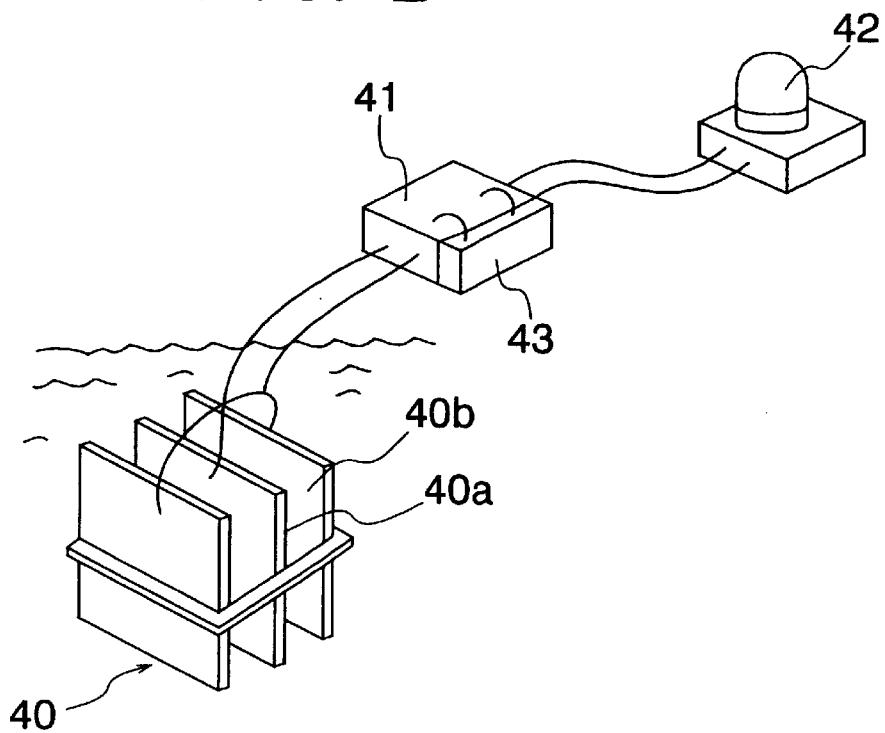
FIG. 2 is a perspective view of the conventional seawater electric power system of FIG. 1.
Figure 3:
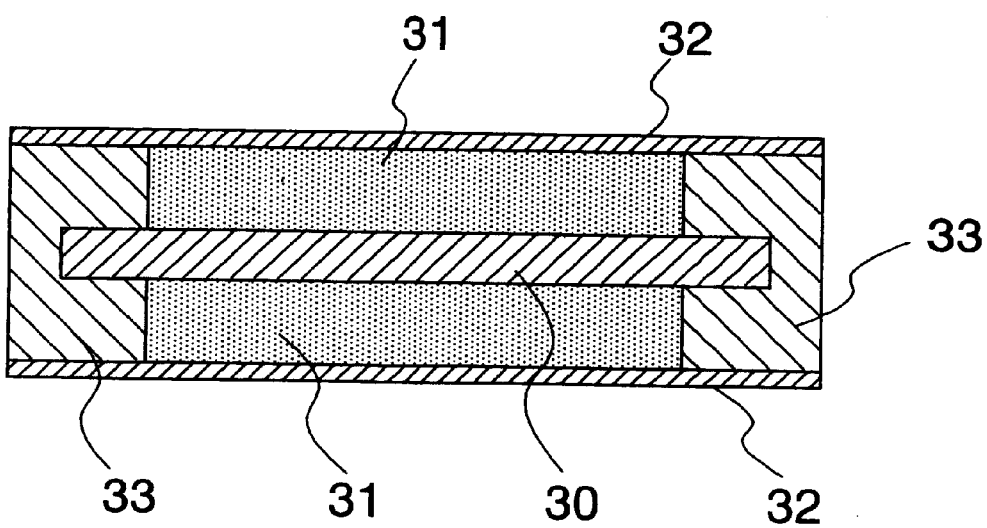
FIG. 3 is a sectional view of a conventional electric double layer capacitor.
Figure 4:
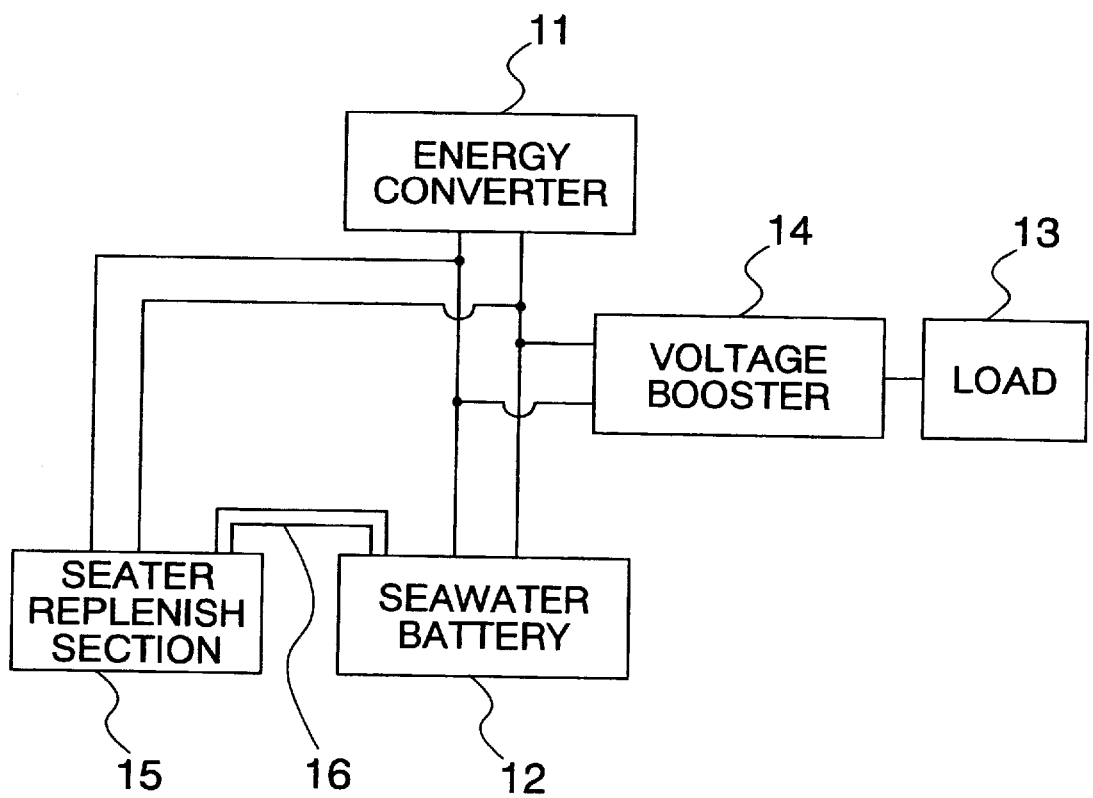
FIG. 4 is a block diagram of a seawater electric power system according to an embodiment of the present invention.

Referring to FIG. 4, a seawater electric power system according to an embodiment of the present invention has a energy converter 11 for converting a natural energy to electric energy, a seawater battery 12 for receiving electric energy from the energy converter 11 to store the electric energy, a voltage converter, connected to the outputs of the energy converter 11, i.e., the inputs of the seawater battery 12, for regulating the output voltage of the seawater electric power system supplied to a load 13, and a seawater replenishment section 15 for replenishing seawater to the seawater battery 12 from the sea on which the system is disposed. The seawater battery has seawater therein as an electrolytic solution for storing the electric energy.

The energy converter 11 may be implemented by a solar cell or a generator for converting wind or wave power, for example.

Figure 5:
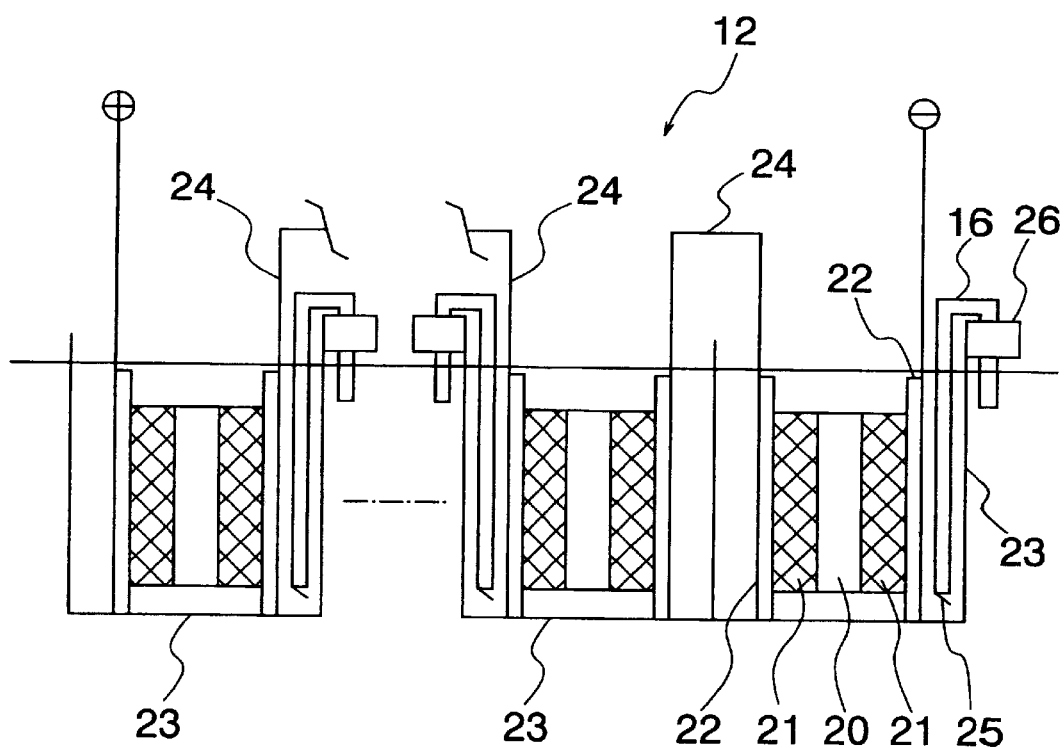
FIG. 5 is a schematic sectional view of the seawater battery shown in FIG. 4.

Referring to FIG. 5, the seawater battery 12 shown in FIG. 4 is implemented by an electric double layer capacitor including a plurality of serial basic cells. Each basic cell has a separator 20 for permitting ion permeation therethrough without electron permeation, a pair of polarized electrodes 21 disposed for sandwiching therebetween the separator 20 and made of sintered, activated carbon which is soaked with seawater, a pair of electric collectors 22 each disposed in contact with the outer surface of a corresponding one of the pair of polarized electrodes 21, and a tray 23 for receiving therein the polarized electrodes 21 and the collectors 22 as well as the seawater. Each collector 22 is formed by dispersion of conductive carbon into a polymer.

Basic cells are mechanically separated from one another, and are connected in series with one another by electric wires 24, thereby generating a desired high voltage power in combination. The tray 23 protects the polarized electrodes 21 and the collector 22 of the basic cell against external force, and insulates the basic cells from one another. In this embodiment, each basic cell stores a maximum of 0.8 volts.

In an exemplified configuration, a solar cell is used as the energy converter 11, and fifteen basic cells each storing a maximum of 0.8 volts are connected in series by wires 24 to generate an output voltage of 12 volts. In the embodiment, each polarized electrode 21 is formed as a square plate having a size of 250 mm×250 mm×4 mm. A sample of the battery of FIG. 5 supplied 0.5-watt power to a 50% duty ratio load for 14 hours, starting from the initial full charged state at a voltage of 12 volts until the 75%-discharged state is reached at a final voltage of 3 volts.

The seawater replenishment section 15 may be driven by natural energy or the electric power generated by the seawater electric power system. The seawater replenishment section 15 comprises a suction tube 16, having a suction end immersed in the sea and a discharge end immersed in the seawater of the tray 23, for siphonic suction of seawater into the tray 23, and a check valve 25 disposed at the discharge end of the suction tube 16. A pump 26 may be provided in the suction tube 16 of the replenish section 15, as shown in FIG. 5. The check valve 25 may be implemented by a disk for opening or closing the discharge end of the suction tube 16. When the level of the seawater in the tray 23 falls below the sea level, seawater is replenished by the function of the section tube 16 to the tray 23 from the sea until the level of the seawater in the tray 23 equals to the sea level. By the configuration, the electrolytic solution or seawater in the electric double layer capacitor lost by evaporation is replenished from the sea on which the system is installed, thereby achieving a long term operation without the need for maintenance.

In the seawater electric power system according to the embodiment, electric power may be generated by a solar cell to feed the load 13 and charge the seawater battery 12 in daytime, and the stored electric power in the seawater battery 12 can be used at nighttime through the voltage converter 14.

Samples of the seawater electric power system according to the embodiment were installed in a marine ambient for straight six months of field-test for experimentally confirming the performance and reliability of the power system. The sample of the seawater electric power system employed a siphonic tube without a pump in the seawater replenish system. The samples of the system were also subjected to iterative durability tests for iterative charge/discharge operations, wherein repetitive tests were conducted for discharging the seawater battery from the initial state of 12 volts to the final 75%-discharged state at a room temperature. Further, an accelerated dehydration test was conducted by continuous application of a specified voltage at a high temperature of 85° C. for examining a durability performance against dehydration.

The iterative durability tests and the accelerated dehydration test were conducted as room tests, wherein the electric power was supplied from a charge/discharge tester without using a solar cell. The seawater was supplied from a seawater tank disposed outside the room, the seawater in the tank being regularly replaced by new seawater.

Table 1 shows the result of the tests as described above for the seawater electric power system according to the embodiment compared to the conventional systems described in JP-A-8-17446 and JP-A-4-288361. In the decision whether or not degradation appeared, a decrease by 20% in the operational time length from the initial operational time length was regarded as the threshold.

|  | Field Test for six month | Iterative Durability Test | Accelerated Dehydration |
| --- | --- | --- | --- |
| Conventional: JP-A-8-17446 | Degraded | Degraded after 1,000 times | Degraded after 500 Hr |
| Conventional: JP-A-4-288361 | Not degraded | Not degraded after 10,000 times | Degraded after 1,000 Hr |
| Sample #1 of Embodiment | Not degraded | Not degraded after 10,000 times | Not degraded after 2,000 Hr |
| Sample #2 of Embodiment | Not degraded | Not degraded after 10,000 times | Not degraded after 2,000 Hr |
| Sample #3 of Embodiment | Not degraded | Not degraded after 10,000 times | Not degraded after 2,000 Hr |

As understood from Table 1, the field tests revealed degradation of the system described in JP-A-8-17446, whereas revealed excellent results for the systems of the present embodiment as well as the system described in JP-A-4-288361.

The iterative durability test revealed degradation of the system described in JP-A-8-17446 after 1000 times of operation, whereas revealed excellent results for the systems of the present embodiment as well as the system described in JP-A-4-288361 after 2000 times of operation.

In the practical point of view, the actual charge/discharge operation occurs at one cycle per a day. Thus, iteration for 1000 times corresponds to 3 years, and thus iteration for 10000 times corresponds 30 years, which may be sufficient for the lifetime of the system in the practical point of view.

The accelerated dehydration test is considered to correspond to 55 times of acceleration in terms of lifetime, and revealed the advantage of the present invention. Specifically, the system described in JP-A-4-288361 degraded after 1000 hours of operation which correspond to about 6 years, whereas the systems of the present embodiment did not degrade after 2000 hours of operation which correspond to about 12 years. The degradation of the system described in JP-A-8-17446 after 500 hours of accelerated dehydration test was considered to result from chemical degradation of the secondary battery, and not from the dehydration.

As revealed by the test results, the seawater electric power system according to the embodiment is superior to the conventional ones in the durability for the iterative charge/discharge operations as well as in the degradation due to the dehydration, thereby increasing the interval for maintenance of the system.

Similar field tests were conducted, with the solar cell being replaced by a wind generator, and revealed similar results. Further, similar field test were also conducted for the system including a replenish section having a pump instead of the siphonic tube, and revealed similar results as well.

Since the above embodiments are described only for examples, the present invention is not limited to the above embodiments and various modifications or alterations can be easily made therefrom by those skilled in the art without departing from the scope of the present invention.

What is claimed is:

1. A seawater electric power system comprising an energy converter for converting non-electrical to electric energy, a battery for storing the electric energy obtained by said energy converter, said battery including at least one electric double layer capacitor having seawater as an electrolytic solution for storing the electric energy, and a seawater replenishment section for replenishing seawater to said battery.

2. The seawater electric power system as defined in claim 1, further comprising a voltage regulator for receiving the electric energy from said energy converter or said battery to output a regulated voltage for the received electric energy.

3. The seawater electric power system as defined in claim 1, wherein said at least one electric double layer capacitor has a separator for permitting ion permeation therethrough without electron permeation, a pair of polarized electrodes sandwiching therebetween said separator, a pair of electric collectors disposed in contact with an outer surface of a corresponding one of said polarized electrodes, and a tray for receiving therein said separator, said polarized electrodes, said electric collectors and said seawater.

4. The seawater electric power system as defined in claim 1, wherein said seawater replenishment section comprises a siphonic tube having a first end immersed in sea and a second end immersed in the seawater in said battery.

5. The seawater electric power system as defined in claim 1, wherein said seawater replenishment section comprises a suction tube having a first end immersed in sea, and a pump disposed in said suction tube for suction of seawater.

6. The seawater electric power system as defined in claim 1, wherein said energy converter is a solar cell.

7. The seawater electric power system as defined in claim 1, wherein said energy converter is a wind generator.

8. The seawater electric power system as defined in claim 1, wherein said battery has an open tray for receiving the seawater.

* * * * *